(12) United States Patent
Turner et al.

(10) Patent No.: US 7,269,002 B1
(45) Date of Patent: Sep. 11, 2007

(54) VEHICLE RECESS INTEGRATED DOCKING STATION

(76) Inventors: Matthew Scott Turner, 300 Martin Luther King, Jr. Dr., #237, Atlanta, GA (US) 30312; James Randle Lively, 1820 Holmes Dr., Conyers, GA (US) 30094-4728

( * ) Notice: Subject to any disclaimer, the term of this patent is extended or adjusted under 35 U.S.C. 154(b) by 0 days.

(21) Appl. No.: 11/392,022

(22) Filed: Mar. 29, 2006

(51) Int. Cl.
G06F 1/16 (2006.01)
H05K 5/00 (2006.01)
H05K 7/00 (2006.01)

(52) U.S. Cl. ............ 361/683; 439/929; 29/592.1; 29/825; 29/832; 29/842; 29/876; 29/883

(58) Field of Classification Search ........ 361/683, 361/686; 29/592.1, 825, 842, 876, 883, 832; 439/929, 34; 248/231.9; 379/446
See application file for complete search history.

(56) References Cited

U.S. PATENT DOCUMENTS

| 5,044,716 | A | 9/1991 | Spearman |
| 5,645,340 | A | 7/1997 | Colton |
| 6,473,302 | B1 | 10/2002 | Korycan et al. |
| 6,483,698 | B1 | 11/2002 | Loh |
| D468,305 | S | 1/2003 | Ma et al. |
| D470,267 | S | 2/2003 | Groendyke |
| 6,629,716 | B2 | 10/2003 | Shibata et al. |
| 6,634,690 | B2 | 10/2003 | Schaal |
| 6,788,528 | B2 | 9/2004 | Enners et al. |
| 2005/0147951 | A1 | 7/2005 | Rohrbach |

Primary Examiner—Javaid H. Nasri
(74) Attorney, Agent, or Firm—George Ronald Reardon

(57) ABSTRACT

An apparatus that can secure an electronic device into a vehicle recess is described. The apparatus provides a vehicle-specific integrated docking station for a digital media player, e.g. Apple's iPod. The docking station contains a connecting assembly to interface the digital media player to a digital media interface than in turn is connected to a vehicle audio system. The vehicle recess may be an ashtray recess, a change-tray recess, a cup-holder recess or other appropriate recess. The vehicles may be automobiles, trucks, boats or aircraft.

3 Claims, 11 Drawing Sheets

VEHICLE RECESS INTEGRATED DOCKING STATION

FIELD OF THE INVENTION

The present invention relates to the field of electronic device accessories. In particular, the present invention relates to a digital media player docking station for vehicle specific recesses.

BACKGROUND OF THE INVENTION

In recent years there has been a virtual explosion in the use of digital media players, both for music, and more recently, video, e.g. the iPod family of devices. The attractiveness of these players is in their capability of storing and playing large amounts of entertainment media without skipping. These attributes make digital media players ideal for use in different environments, including the environments of vehicles, e.g. automobiles, trucks, boats and aircraft. However using a digital media player in a moving vehicle presents several problems, e.g. where to place the digital media player so that it can be easily operated, cable clutter, and access to power. These and other problems exist.

For use in a vehicle environment it is desirable to utilize an existing recess, e.g. an ashtray recess, a console cup-holder recess, or to create a new recess, e.g. within an existing portion of a vehicle or outside of an existing portion of the vehicle interior, for installing a device both to secure the digital media player and to invisibly connect the digital media player to the components needed for the digital media player to function properly, e.g. connectors, cabling, an interface box and a radio.

Previous attempts to address the problem of using a digital media player in a moving vehicle include Belkin's Tunedock, which fits into a cup-holder, has a gooseneck-style arm extending out of the cup area with a plastic cradle mounted to the Tunedock in which an iPod rests. The iPod is secured with a suction cup. The Tunedock has no wiring provisions, meaning that any interface cable will be exposed. The Tunedock does not feature an integrated connector.

Dension also has a plastic cradle for an iPod which does have an integrated connector. Dension's device is a universal piece that mounts wherever an installer can make it fit. Dension's cradle wraps around an iPod and is specific to the size iPod used. Dension's cradle is restricted to work only with the Dension ICELink product line.

Published patent application 2005/0147951, inventor Matthew Rohrbach, published on Jul. 7, 2005, discloses an apparatus that can secure an electronic device and be inserted into a conventional cup holder. One use of the cup holder is for inside of an automobile. The electronic device being held can be a variety of devices that include a digital music player. One embodiment of the invention includes a spool about which connecting cable can be wound. Adapting sleeves that fit around the base of the apparatus can be used to adapt the electronic device holder to cup holders of different sizes and shapes.

Other related art includes the following patents.

U.S. Pat. No. 6,788,528, issued to Ryan S. Enners, and Lee Macklin on Sep. 7, 2004, discloses a docking station and holder for use with a portable computer, and in particular, an HP Jornada portable computer. The docking station has a contour that is designed to receive the HP Jornada portable computer. The docking station connects to a center console of a vehicle. The docking station has a cradle that holds the portable computer in place while driving. The docking station has a cigarette lighter adapter for power and a cable that connects it to a stereo system of the vehicle to provide for audio (MP3) playback of music.

U.S. Pat. No. 6,473,302, issued to George M. Korycan and William F. Zancho on Oct. 29, 2002, discloses a communications device holder that includes a tongue that is adapted to mate with and be latched within a seat belt buckle of an unoccupied vehicle passenger position. The communications device holder includes a docking assembly that is adapted to receive and securely hold a communications device. The docking assembly includes interfaces for power, speakers, microphones and the like. A flexible member is alternatively attached to the tongue to flexibly configure the position of the device holder. A seat belt buckle is optionally attached to the communications device holder for securing the device holder both with the seat belt buckle for a passenger position and with the seat belt.

U.S. Pat. No. 6,483,698, issued to Phillip Kwok Nan Loh on Nov. 19, 2002, discloses a cradle for supporting a PDA and similar electronic devices having a movable back supporting element. The back supporting element extends in one position to support the back of a portable device when the device is received by the cradle. The cradle also includes a supporting region which supports the end of the portable device. When the portable device is not in the cradle, the supporting element can be moved to a position in which it covers the end supporting region.

U.S. Pat. No. D468,305, issued to Judy Jeonghye Ma, David Townsend and Burton S. Lowry on Jan. 7, 2003, illustrates a base for receiving a portable communication device or for receiving similar articles.

U.S. Pat. No. D470,267, issued to Richard L. Groendyke on Feb. 11, 2003, illustrates an ashtray pocket insert.

U.S. Pat. No. 5,645,340, issued to Orren L. Colton on Jul. 8, 1997, discloses a flashlight assembly for use in a vehicle to replace an ashtray. The flashlight includes a front handle portion conformable to the opening of an ashtray and when inserted into the ashtray opening, in place of the ashtray, blends in with the vehicle console or dashboard. The flashlight is slidably or pivotably mounted in the ashtray opening, and is easily removable from the ashtray opening, for use by an operator or others, as needed. A charging contact may be added to the ashtray opening for recharging a rechargeable flashlight, or batteries held within the flashlight, when the flashlight is inserted fully into the ashtray opening contacting the charging contact.

U.S. Pat. No. 5,044,577, issued to John W. Spearman on Sep. 3, 1991, discloses a holder device for a beverage container and accessories which includes an anchor and a holder body. The anchor includes a wedge-like element adjustably connected to the holder body. An insertion element is adapted for insertion into an ashtray socket for anchoring the holder body so that a beverage container is horizontally held by the holder device within container receptacles.

U.S. Pat. No. 6,629,716, issued to Minoru Shibata and Katsuhiro Katagiri on Oct. 7, 2003, discloses a structure for holding switches in a passenger compartment of a vehicle. The structure includes a switchboard arranged on a panel in the passenger compartment. The switches are mounted on the switchboard. An accommodating case is arranged adjacent to the switchboard. A common shaft, which is shared by the switchboard and the accommodating case, pivotally supports the switchboard and the accommodating case. The switchboard and the accommodating case are each pivoted about the common shaft between a retracted position and an operational position. The switchboard and the accommodating case are each accommodated in the panel when located at the retracted position and exposed from the panel when located at the operational position. The switchboard remains at the retracted position when the accommodating case is located at the operational position.

U.S. Pat. No. 6,634,690, issued to Falk Schaal on Oct. 21, 2003, discloses a built-in combination for use in a motor vehicle that includes an ashtray that is displaceable forwards into an inaccessible position and rearwards into an accessible position. A receiving element having an insertion opening for a beverage container is arranged at the rear side of the ashtray. The receiving element is pivotally connected to the ashtray, thus taking up a position of use when the ashtray is displaced forwards. In the position of use, a beverage container can be inserted into the insertion opening.

While these patents and other previous methods have attempted to solve the problems that they addressed, none have utilized or disclosed utilizing existing vehicle recesses to extend existing vehicle audio systems to a secured digital media player, as does embodiments of the present invention.

Therefore, a need exists for a vehicle recess integrated docking station with these attributes and functionalities. The vehicle recess integrated docking station according to embodiments of the invention substantially departs from the conventional concepts and designs of the prior art. It can be appreciated that there exists a continuing need for a new and improved vehicle recess integrated docking station which can be used commercially for securing a digital media player securely in a vehicle while eliminating visible cable clutter. In this regard, the present invention substantially fulfills these objectives.

The foregoing patent and other information reflect the state of the art of which the inventors are aware and are tendered with a view toward discharging the inventors' acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a vehicle-specific integrated docking station for a digital media player. In particular, the present invention relates to a device that coverts a vehicle's ashtray recess, coin holder recess, cup-holder recess or other appropriate recess into a fully functional docking station for a digital media player, e.g. Apple's iPod.

The present invention is comprised of a base that is formed to fit into a target recess of a vehicle, either an existing recess or a created recess. This base may be colored and/or textured to closely match one or more aspects of the interior of the vehicle. A portion of the base is comprised of an opening sized for insertion of a male connector, e.g. a male 30-pin dock connector that is affixed within the opening such that a corresponding female connector on a digital media device can be releasable connected to the male connector. The area surrounding this opening is formed for the snapping on or placement of a dock-insert, e.g. Apple's universal dock insert.

One embodiment of the present invention is further comprised of a pigtail connected to the male connector, exiting the back or underside of the base and a female 30-pin connector attached to the pigtail. In another embodiment the male connector and female connector are formed in one piece without a connecting pigtail. The female connector is operable for connection to the male connector of a conversion box that interfaces with the vehicle sound system, e.g. a radio. In some embodiments the present invention is operable to accept Apple's universal dock inserts for a perfect fit, regardless of which iPod is being docked.

In one embodiment the present invention is made by creating a base that is an exact negative copy of a vehicle recess, e.g. a cup-holder recess, the recess for an ashtray insert, the recess for a change tray insert, a created recess within an unused interior panel. An Apple universal dock well is blended into the top side of the base oriented towards the driver of the vehicle. A male dock connector is installed into the dock well. 30 wires are then connected to the male dock connector. The other end of the 30 wires are then connected to a corresponding female connector. The portion of the base that will be visible after insertion into the target recess is then colored and/or textured to match or compliment the color and or texture of the vehicle interior.

The base is preferably made from injection molded plastic.

One aspect of the present invention is the ability to work with any manufacture's interface cable.

Another aspect of the present invention is that it can be made inexpensively.

Another aspect of the present invention is that it can be made of readily available materials.

Another aspect of the present invention is that it is easy to install.

Another aspect of the present invention is that it is easy to use.

Another aspect of the present invention is that it uses a universal dock well formed to fit a universal dock insert.

Another aspect of the present invention is that is releasably secures a digital media player in a vehicle environment.

These and other features and advantages of the present invention will be presented in more detail in the following specification of the invention and the accompanying figures, which illustrate by way of example the principles of the invention.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1:
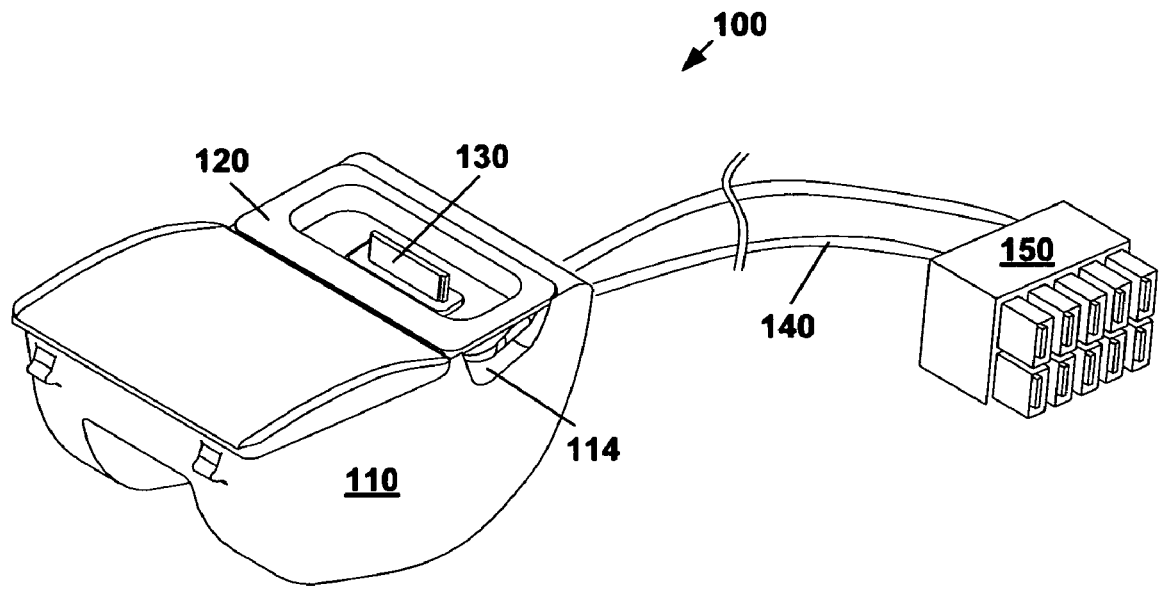
FIG. 1 illustrates a perspective view of a vehicle recess integrated docking station according to one embodiment of the present invention.

FIG. 1 illustrates a front perspective view of a vehicle recess integrated docking station 100 for an ashtray recess, according to one embodiment of the present invention. Vehicle recess integrated docking station 100 is comprised of recess specific insert base 110, a connection slot (not shown), dock insert well 114 and dock insert 120. Dock insert 120 is snapped onto recess specific insert base 110 at dock insert well 114. A male dock connector 130 is inserted through the connection slot in the recess specific insert base 110 and a corresponding slot in the dock insert 120. A male-to-female connection 140 connects male dock connector 130 to female dock connection 150.

Figure 2:
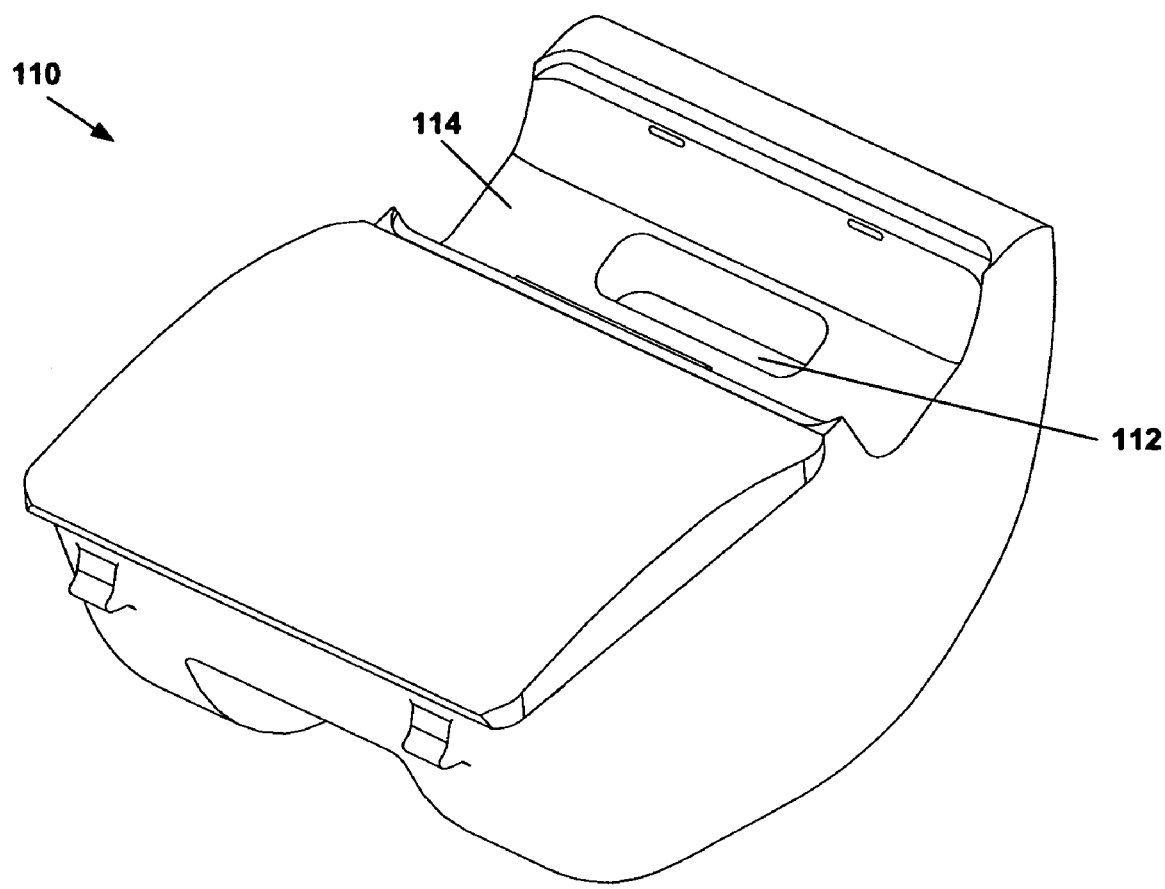
FIG. 2 illustrates a perspective view of a recess specific insert base according to one embodiment of the present invention.

FIG. 2 illustrates a front perspective view of a recess specific insert base 110 for an ashtray recess, according to one embodiment of the present invention. Connection slot 112 is illustrated, as is dock insert well 114.

Figure 3:
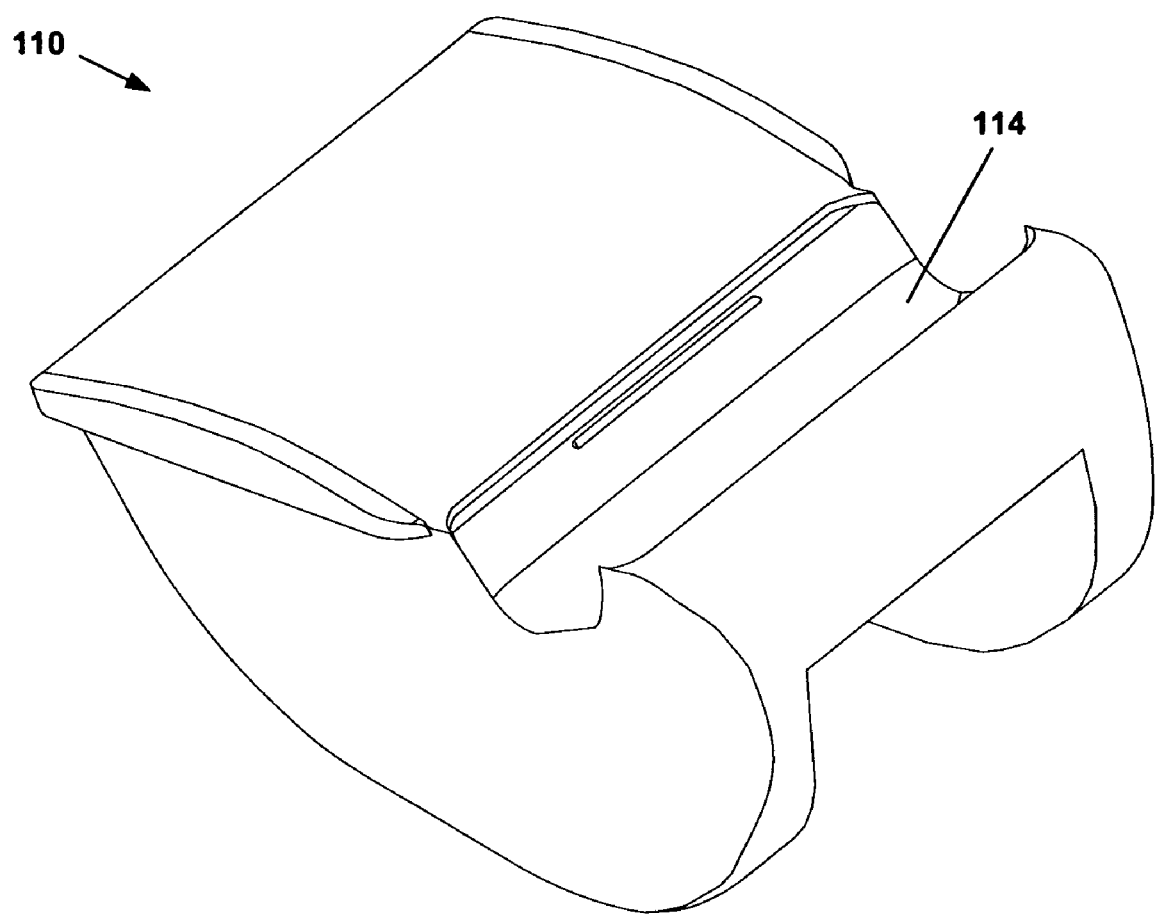
FIG. 3 illustrates a perspective view of recess specific insert base according to on embodiment of the present invention.

FIG. 3 illustrates a rear perspective view of a recess specific insert base 110 for an ashtray recess, according to one embodiment of the present invention. Dock insert well 114 is also illustrated.

Figure 4:
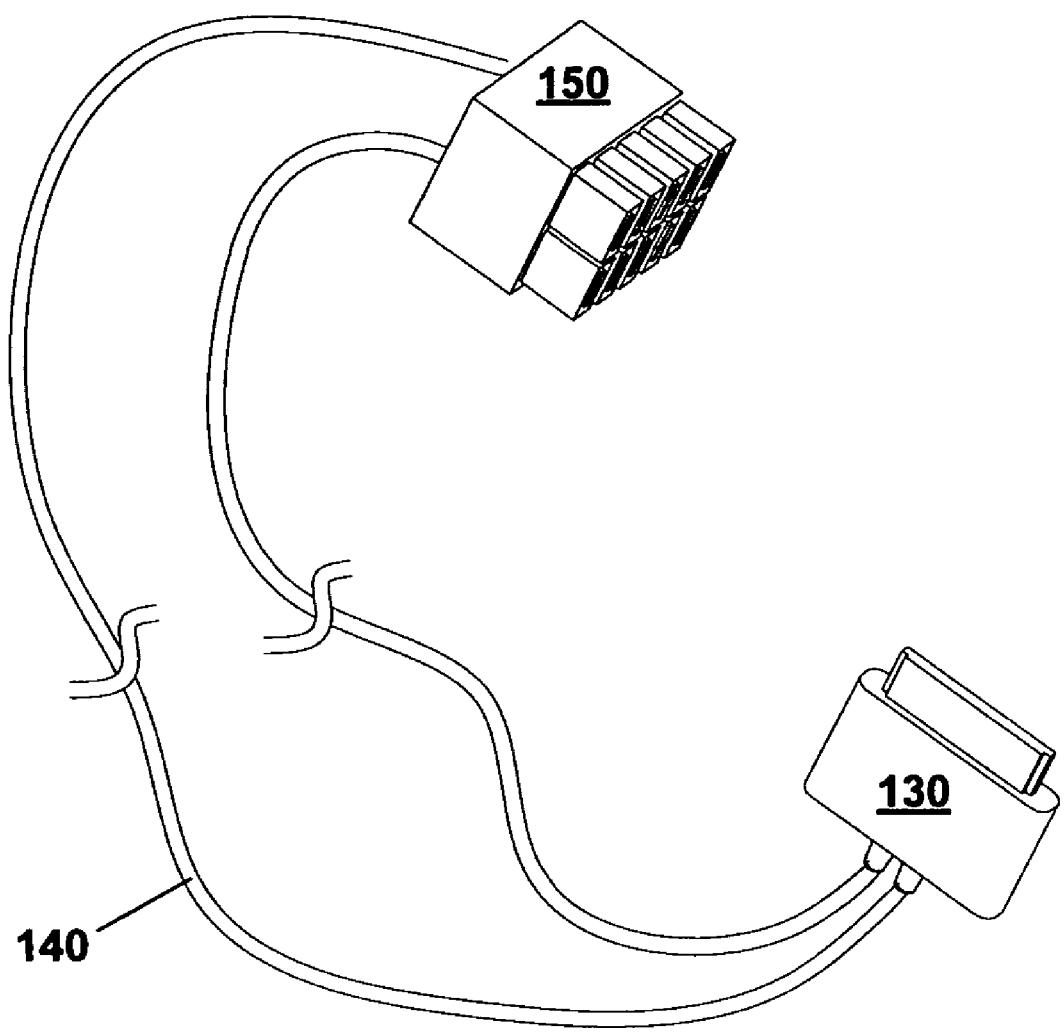
FIG. 4 illustrates a male dock connector a female dock connector and a male-to-female connection according to one embodiment of the present invention.

FIG. 4 illustrates a male dock connector 130 connected to a female dock connector 150 via a male-to-female connection 140. Female dock connector 150 attaches to a converter box (not shown), which in turn connects to the vehicle audio system (not shown). In the preferred embodiment male dock connector 130 is a 30-pin dock connector, female dock connector 150 is a 30-pin dock connector and male to female connection 140 contains 30 wires.

Figure 5:
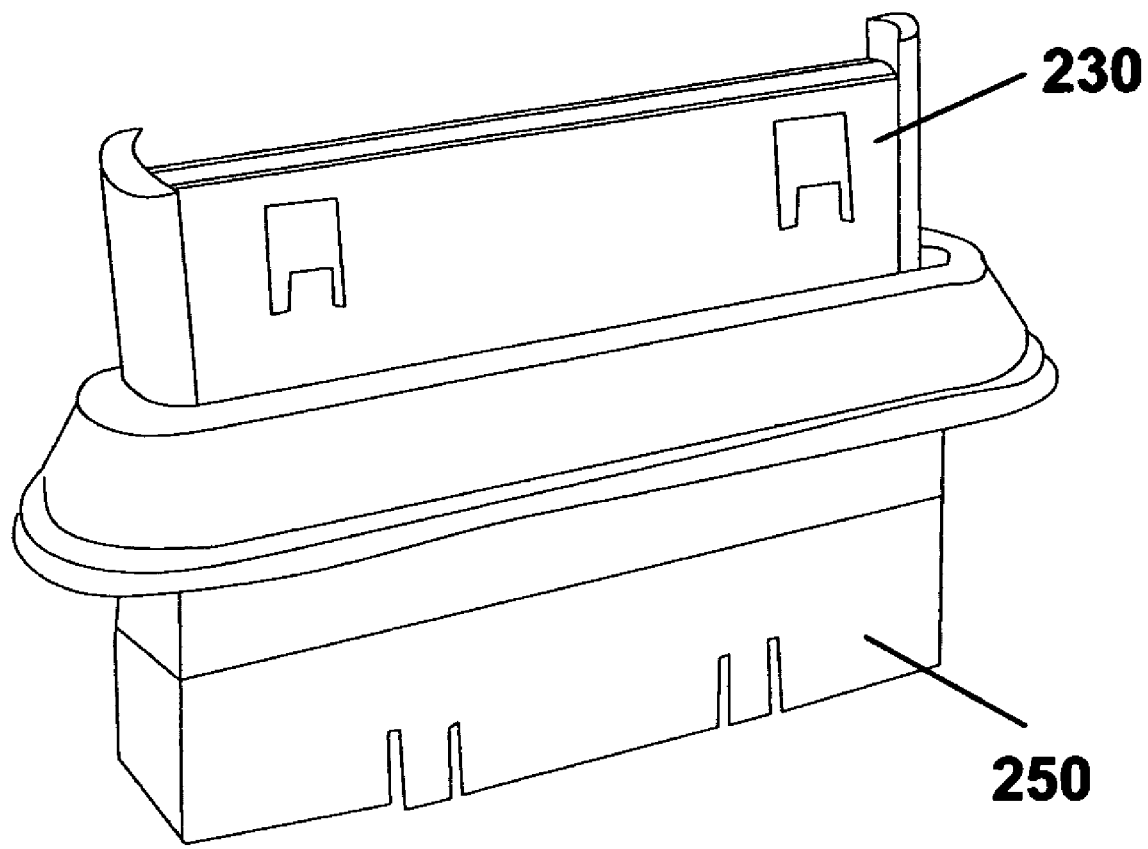
FIG. 5 illustrates a perspective view of a male dock connector and female dock connector according to one embodiment of the present invention.

FIG. 5 illustrates a male dock connector 230 connected to a female dock connector 250 in a casing without visible external connecting wires. Female dock connector 250 attaches to a converter box (not shown), which in turn connects to the vehicle audio system (not shown).

Figure 6:
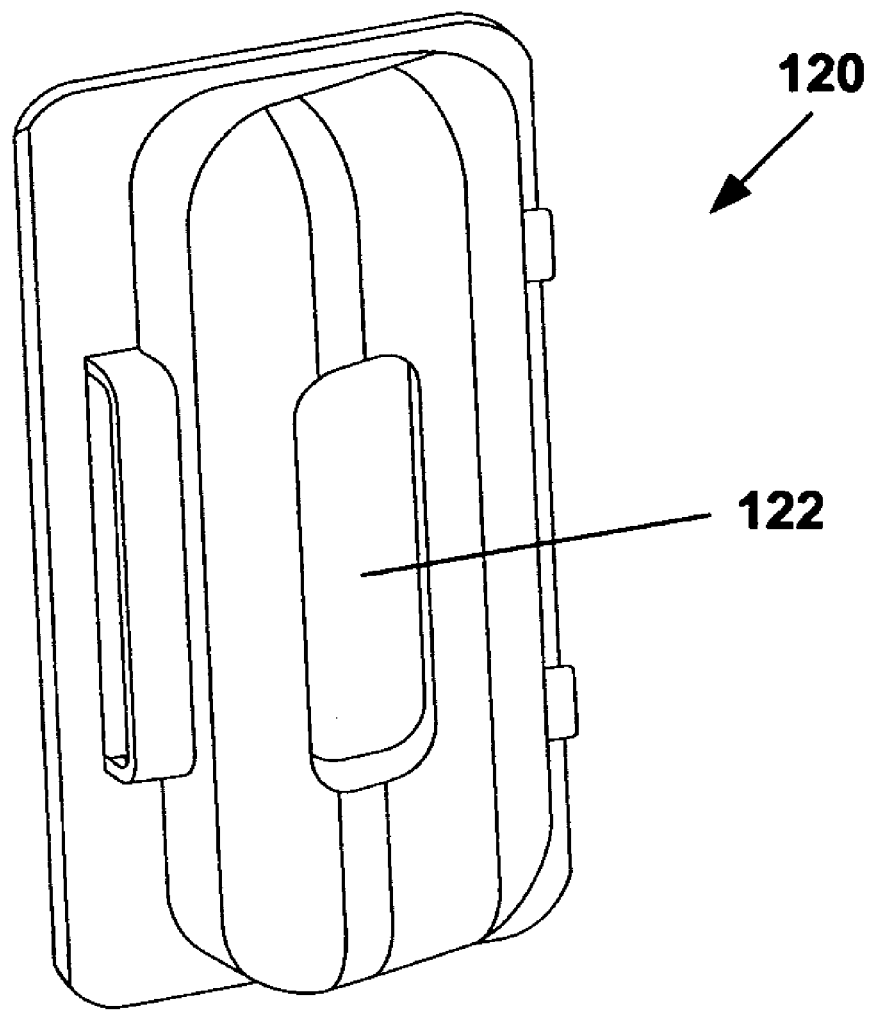
FIG. 6 illustrates a perspective view of dock insert according to one embodiment of the present invention.

FIG. 6 illustrates a bottom perspective view of dock insert 120 showing dock insert slot 122.

Figure 7:
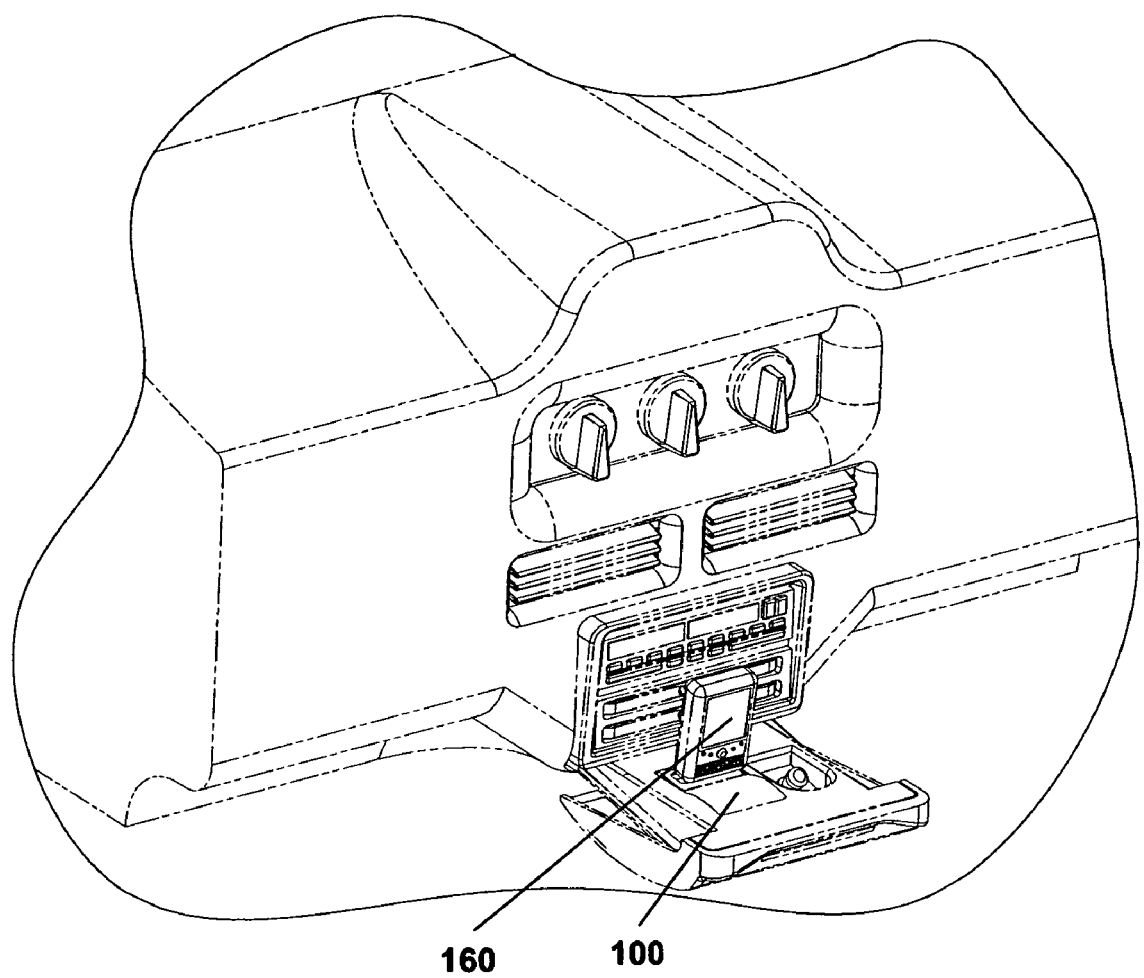
FIG. 7 illustrates a vehicle recess integrated docking station installed in a vehicle ashtray recess according to one embodiment of the present invention.

FIG. 7 illustrates a digital media player 160 releasably attached to vehicle recess integrated docking station 100 installed within the recess for an ashtray in a vehicle.

Figure 8:
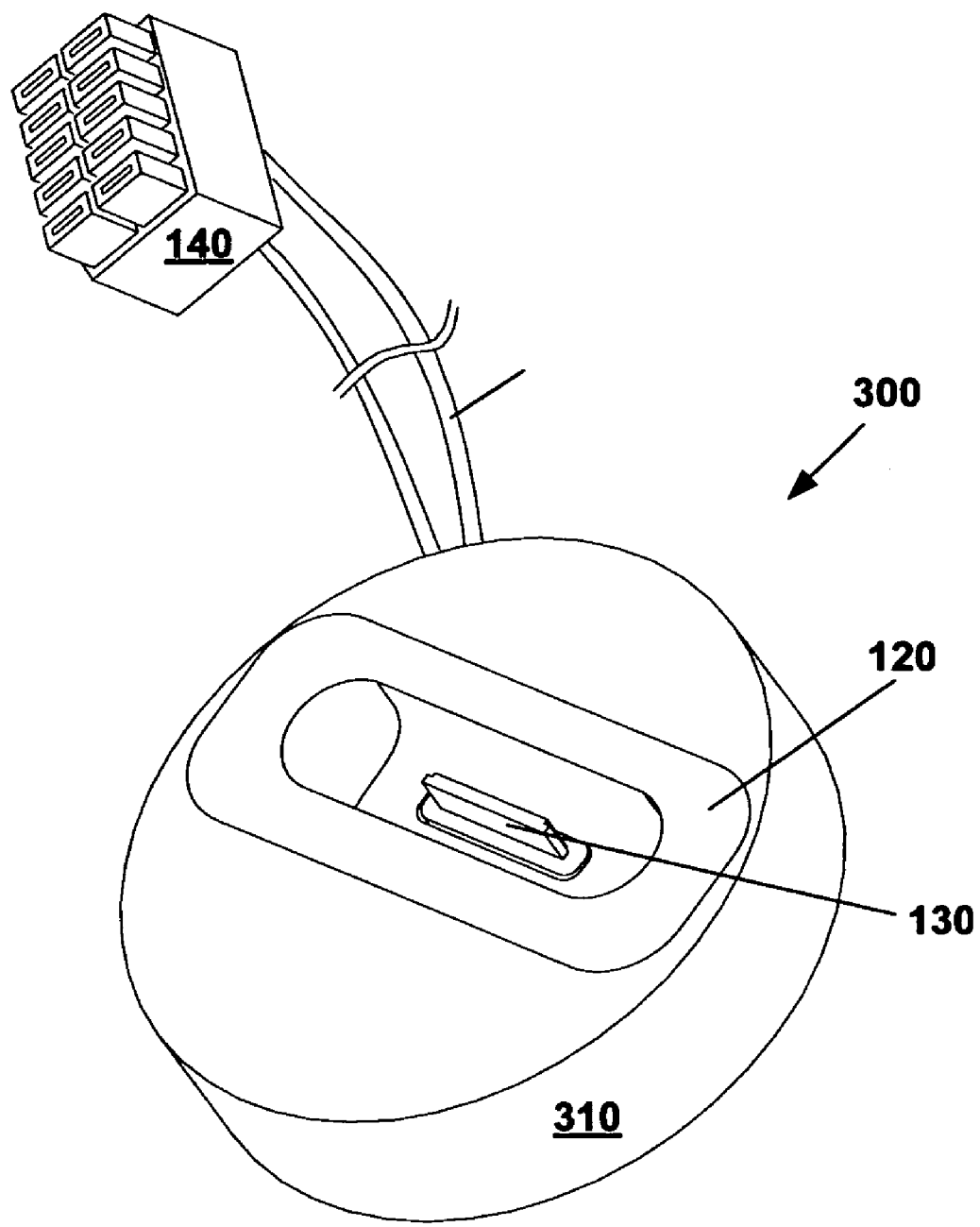
FIG. 8 illustrates a perspective view of a vehicle recess integrated docking station according to one embodiment of the present invention.

FIG. 8 illustrates a front perspective view of a vehicle recess integrated docking station 300 for a cup-holder recess, according to one embodiment of the present invention. Illustrated are recess specific insert base 310, dock insert 120, male dock connector 130, male-to-female connection 140, and female dock connection 150.

Figure 9:
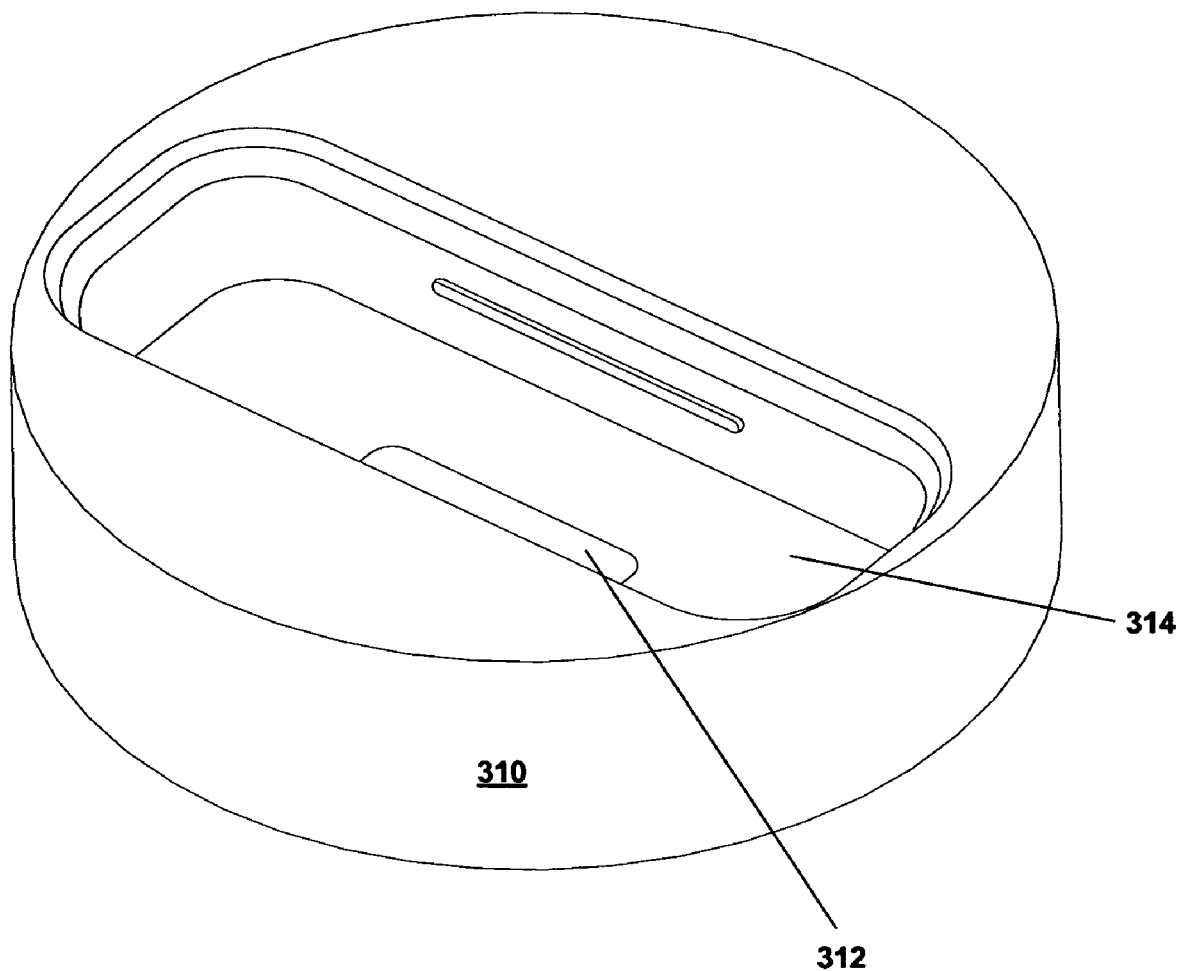
FIG. 9 illustrates a perspective view of a recess specific insert base according to one embodiment of the present invention.

FIG. 9 illustrates a front perspective view of a recess specific insert base 310 for a cup-holder recess, according to one embodiment of the present invention. Connection slot 312 is illustrated as is dock insert well 314.

Figure 10:
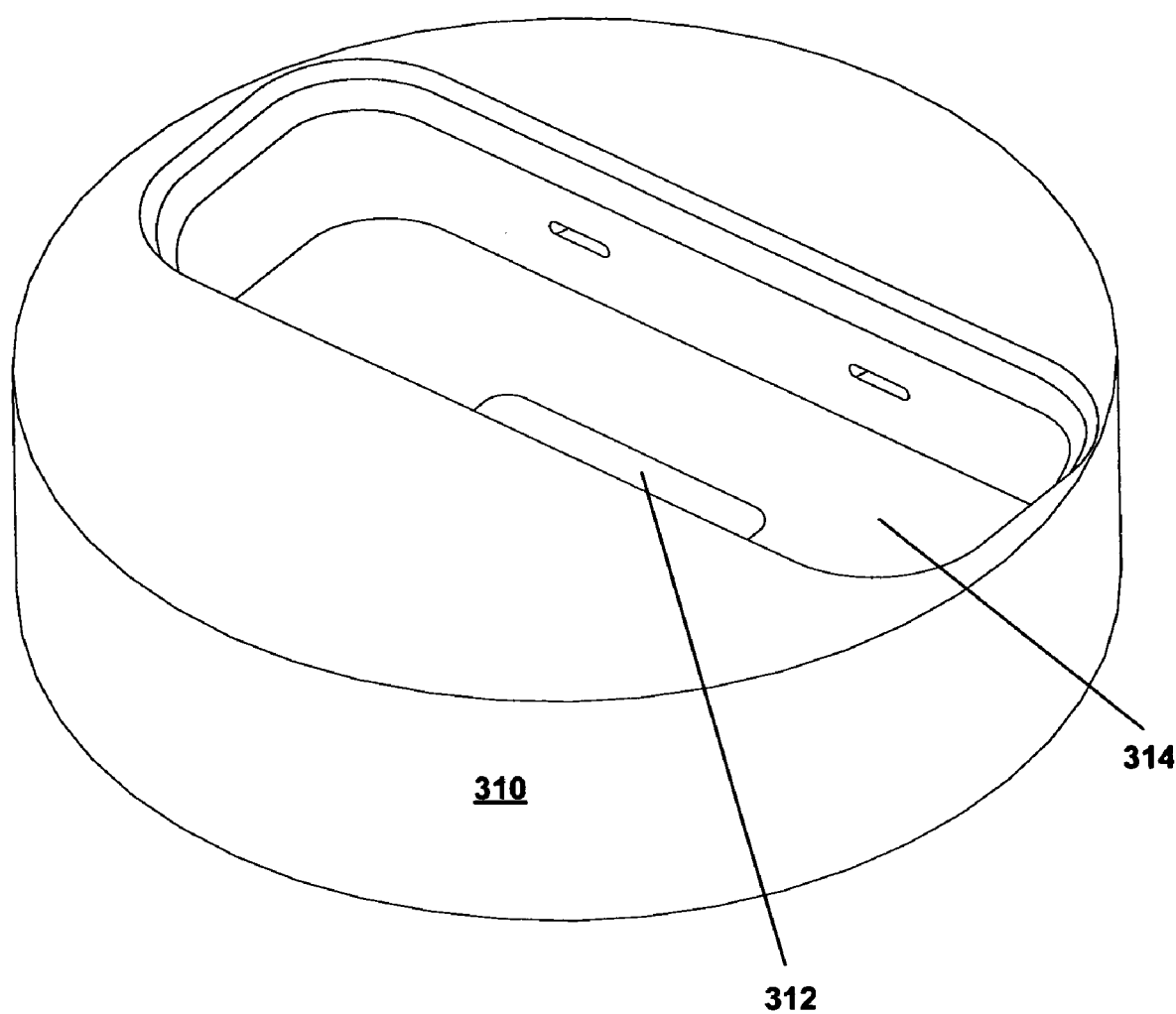
FIG. 10 illustrates a perspective view of a recess specific insert base according to one embodiment of the present invention.

FIG. 10 illustrates a rear perspective view of a recess specific insert base 310 for a cup-holder recess, according to one embodiment of the present invention. Dock insert well 314 and connection slot 312 are also illustrated.

Figure 11:
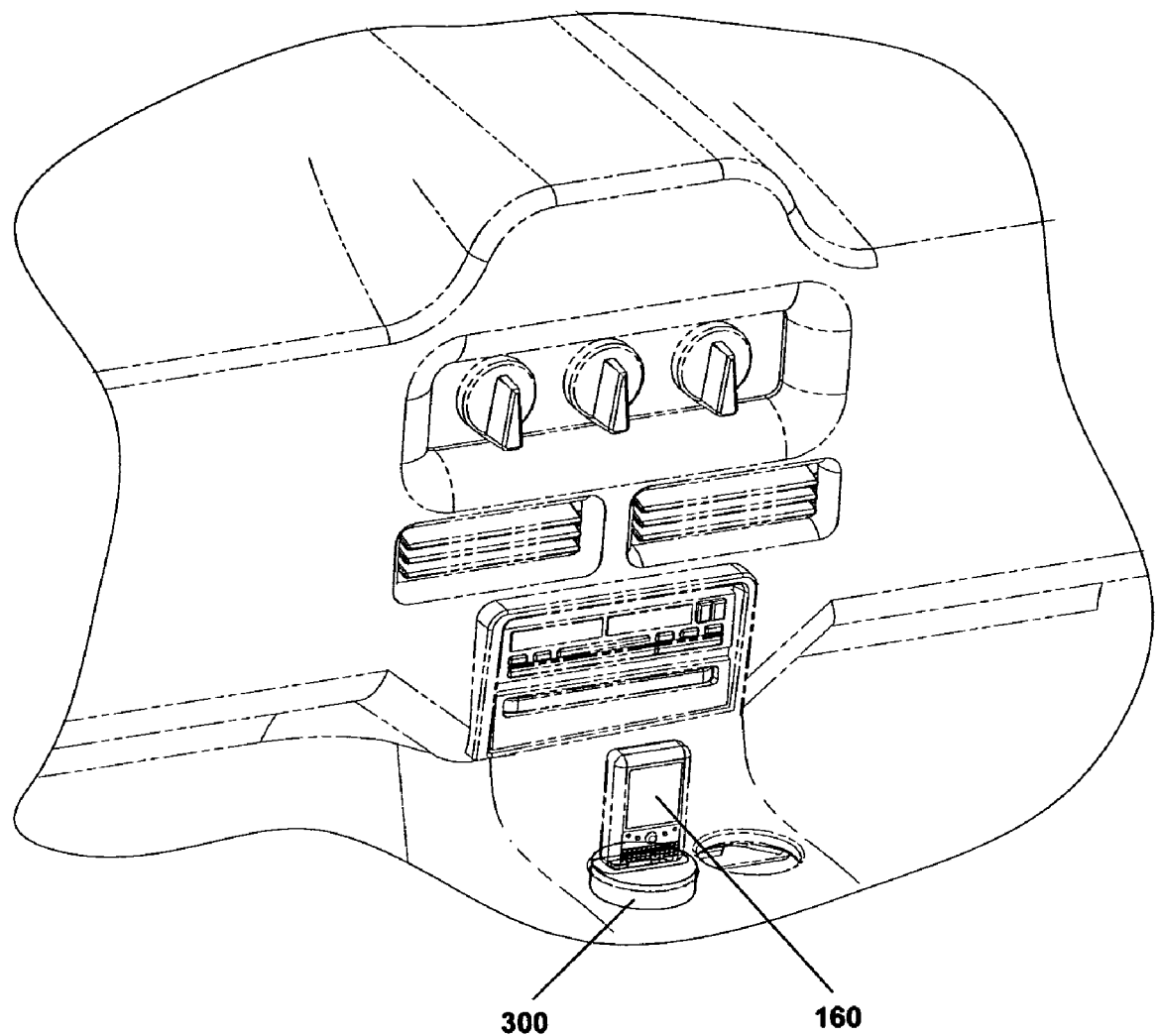
FIG. 11 illustrates a vehicle recess integrated docking station installed in a vehicle console cup-holder recess according to one embodiment of the present invention.

FIG. 11 illustrates a digital media player 160 releasably attached to vehicle recess integrated docking station 300 installed within the recess for a console cup-holder in a vehicle.

An embodiment of the present invention is made as follows.

Obtain a vehicle having at least one recess into which the present invention can be installed, e.g. an ashtray insert recess, a console cup-holder recess, a change holder recess. Using a digitizer device such as a 3-D Microscribe, create a three dimensional CAD model of the chosen recess so that an initial base that is a substantially exact negative copy of the target recess can be digitally created. Using CAD, add a dock insert well and a connection slot into the base, ensuring that the orientation of the insert well and the connection slot will allow the user to have convenient and appropriate access to the digital media player. Create a final base utilizing a 3D printer with the digital file as input. Test fit and modify the final base digitally if needed so that it fits snugly. Send this completed and revised file to a manufacturing facility for steel or aluminum mold creation and injection molding of individual units. The final product manufacturer then adds to each injected molded base a textured coating and color in order to approximately match the interior texture and color of the vehicle in which the present invention will be installed. Snap in a universal dock insert such that the dock slot aligns with the connector slot. Assemble a male dock connector to a female dock connector. Connect this assembly so that the male dock connector is pushed through the dock slot and connector slot and is securely affixed to the final injection molded base to form an embodiment of the present invention.

To install an embodiment of the present invention within a vehicle first install a digital media interface, e.g. iPod interface, such that it is operably connected to the vehicle's media system, e.g. radio. The digital media interface cable is then routed to the area where the present invention will be installed. A small hole, e.g. ¾", will sometimes need to be drilled in this area to accommodate the wiring from the present invention. The digital media cable is then plugged into the wiring from an embodiment of the present invention during the installation process.

What is claimed is:

1. A method of making an electronic device holding system comprising:
   obtaining a vehicle having at least one recess suitable for installation of the electronic device holding system;
   selecting a target recess;
   forming an initial base using the target recess;
   creating a first three dimensional digital file of the target recess using the initial base and a digitizer device;
   modifying the first three dimensional digital file to create a second three dimensional digital file by adding a dock insert well and connection slot while ensuring that the orientation of the insert well and the connection slot will allow a user to have convenient and appropriate access to a digital media player;
   creating a second base utilizing a 3D printer with the second three dimensional digital file as input;
   testing the second base in the target recess for fit;
   modifying the second three dimensional digital file if needed to create a third three dimensional file;
   creating a third base that fits snugly in the target recess using the third three dimensional file;
   creating a mold suitable for injection molding using the third base;
   forming at least one fourth base having a connector slot by injection molding;
   adding a textured coating and color to the fourth base;
   attaching a universal dock insert having a dock slot into the fourth base such that the dock slot aligns with the connector slot;
   assembling a male dock connector to a female dock connector to form a male-female connector assembly;
   connecting the male-female connector assembly to the fourth base by inserting the male dock connector through the connector slot and the dock slot; and
   affixing the male dock connector to the fourth base to form a vehicle recess docking station.

2. The method as recited in claim 1, further comprising connecting a digital media interface to a sound system in the vehicle.

3. The method as recited in claim 2, further comprising connecting the vehicle recess docking station to the digital media interface.

* * * * *